United States Patent
Tezuka et al.

(10) Patent No.: US 9,436,178 B2
(45) Date of Patent: Sep. 6, 2016

(54) PARAMETER ADJUSTMENT SUPPORT DEVICE HAVING FUNCTION FOR SUPPORTING PARAMETER ADJUSTMENT

(71) Applicant: FANUC CORPORATION, Yamanashi (JP)

(72) Inventors: Junichi Tezuka, Yamanashi (JP); Hajime Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 43 days.

(21) Appl. No.: 14/563,123

(22) Filed: Dec. 8, 2014

(65) Prior Publication Data
US 2015/0160647 A1 Jun. 11, 2015

(30) Foreign Application Priority Data
Dec. 11, 2013 (JP) ................................. 2013-256037

(51) Int. Cl.
G05B 19/416 (2006.01)
G05B 13/02 (2006.01)

(52) U.S. Cl.
CPC ................................. G05B 19/416 (2013.01)

(58) Field of Classification Search
CPC G05B 19/416; G05B 19/4069; G05B 19/18; G05B 19/414; G05B 19/4141; G05B 2219/50216; G05B 2219/50218; G05B 19/182; G05B 19/404; G05B 19/406; G05B 19/4061; G05B 2219/35346; G05B 2219/36045
USPC .................. 318/600, 671, 573; 700/186, 188
See application file for complete search history.

(56) References Cited

U.S. PATENT DOCUMENTS 4,652,804 A * 3/1987 Kawamura .......... G05B 19/416
    318/573
6,404,160 B2 * 6/2002 Sagasaki ................ G05B 19/18
    318/560

(Continued)

FOREIGN PATENT DOCUMENTS

JP        H0125940 A    10/1989
JP        H06059594 B    8/1994

(Continued)

OTHER PUBLICATIONS

English Machine Translation for Japanese Publication No. 2002-132349 published May 10, 2002, 10 pgs.
English Translation of Japanese Publication No. H11202925, published Jul. 30, 1999, 14 pages.

(Continued)

Primary Examiner — Paul Ip
(74) Attorney, Agent, or Firm — Fredrikson & Byron, P.A.

(57) ABSTRACT

A parameter adjustment support device configured to effectively adjust an acceleration/deceleration parameter of a drive axis, even when an operator thereof is inexperienced. The Support device includes: an actual acceleration/deceleration characteristic obtaining part which obtains an actual acceleration/deceleration characteristic curve relating to a velocity and an acceleration of the drive axis, from a numerical controller or an external storing device; a parameter setting part which sets or changes the parameter based on an external input; an acceleration/deceleration characteristic displaying part which generates a commanded acceleration/deceleration characteristic curve relating to the velocity and the acceleration of the drive axis based on the setup or updated parameter, and contrastively displays the obtained actual curve and the generated commanded curve; and a setting information outputting part which outputs the setup or updated parameter to the numerical controller.

7 Claims, 5 Drawing Sheets

(56) References Cited

U.S. PATENT DOCUMENTS

| | | | | |
|---|---|---|---|---|
| 2002/0003416 | A1* | 1/2002 | Sagasaki | G05B 19/18 318/600 |
| 2002/0045957 | A1* | 4/2002 | Otsuki | G05B 19/416 700/63 |
| 2005/0149224 | A1* | 7/2005 | Sakagami | G05B 19/416 700/188 |
| 2010/0087948 | A1* | 4/2010 | Yamaguchi | G05B 19/4069 700/178 |
| 2011/0035028 | A1* | 2/2011 | Maekawa | G05B 19/406 700/29 |
| 2012/0007536 | A1* | 1/2012 | Iwashita | G05B 19/4069 318/573 |
| 2012/0296462 | A1* | 11/2012 | Otsuki | G05B 19/4069 700/104 |
| 2013/0173045 | A1* | 7/2013 | Kawana | G05B 19/404 700/186 |
| 2013/0300337 | A1* | 11/2013 | Nagaoka | G05B 19/416 318/671 |

FOREIGN PATENT DOCUMENTS

| | | |
|---|---|---|
| JP | H08137537 A | 5/1996 |
| JP | H11202925 A | 7/1999 |
| JP | 2002132349 A | 5/2002 |

OTHER PUBLICATIONS

English Translation of Japanese Publication No. H08137537, published May 31, 1996, 19 pages.

Partial English Translation of Japanese Publication No. H06059594, published Aug. 10, 1994, 9 pages.

English Translation of Abstract for Japanese Publication No. H01259403, published Oct. 17, 1989, 1 page.

* cited by examiner

PARAMETER ADJUSTMENT SUPPORT DEVICE HAVING FUNCTION FOR SUPPORTING PARAMETER ADJUSTMENT

BACKGROUND OF THE INVENTION

1. Field of the Invention

The preset invention relates to a parameter adjustment support device having a function for supporting adjustment of an acceleration/deceleration parameter for a motor which drives a drive axis of a machine tool, etc.

2. Description of the Related Art

In the prior art, in a numerical controller for controlling a drive axis of a machine tool, an acceleration/deceleration control process is usually carried out in relation to a movement command given in an NC program. In the acceleration/deceleration control process, a movement command for the drive axis is generated so that the drive axis is accelerated or decelerated according to a commanded acceleration characteristic curve obtained by an acceleration/deceleration parameter.

In this regard, a commanded acceleration must be appropriately determined in order that the movement command for the drive axis does not exceed the capacity of the drive axis (or the motor for driving the drive axis). For example, JP 2002-132349 A discloses an acceleration/deceleration control method which is applicable to an automated machine with a high-speed positioning function. In this method, an acceleration/deceleration process is carried out, wherein a condition that the relationships between the velocity and the acceleration in a low-speed portion and a high-speed portion are symmetrical is excluded, so that an actual acceleration curve follows a limited acceleration curve as possible.

In order to carry out the acceleration/deceleration process corresponding to the actual acceleration characteristic of the drive axis, it is necessary to appropriately set the acceleration/deceleration parameter so as to obtain a commanded acceleration/deceleration characteristic curve close to an ideal characteristic. However, in the prior art, when such setting is carried out, an operator must repeatedly adjust a plurality of acceleration/deceleration parameters by using a manual, which takes great amount of time and effort. Therefore, the parameters cannot be adjusted unless the operator has skill and knowledge.

In addition, when the movement command exceeds the capacity of the drive axis (or the motor for driving the drive axis), the motor cannot follow the movement command. Therefore, the commanded acceleration must be appropriately determined within the motor capacity. In JP 2002-132349 A, when acceleration/deceleration property is limited so as to fit a high-speed area, the acceleration/deceleration property cannot be sufficiently delivered in a low-speed area, and thus the acceleration/deceleration process is carried out based on a limited acceleration/deceleration curve (or a commanded acceleration/deceleration characteristic curve). However, the technique in JP 2002-132349 A does not support adjustment of the acceleration/deceleration parameter for providing the commanded acceleration/deceleration characteristic curve.

SUMMARY OF THE INVENTION

Therefore, an object of the present invention is to provide a parameter adjustment support device configured to effectively adjust an acceleration/deceleration parameter of a drive axis, even when an operator thereof is inexperienced.

According to the present invention, there is provided a parameter adjustment support device for supporting adjustment of an acceleration/deceleration parameter, used with a numerical controller which generates a movement command for a drive axis by using a commanded acceleration/deceleration characteristic curve previously given by the acceleration/deceleration parameter, the parameter adjustment support device comprising: an actual acceleration/deceleration characteristic obtaining part which obtains an actual acceleration/deceleration characteristic curve relating to a velocity and an acceleration of the drive axis, from the numerical controller or an external storing device; a parameter setting part which sets or changes the acceleration/deceleration parameter based on an external input; an acceleration/deceleration characteristic displaying part which generates the commanded acceleration/deceleration characteristic curve relating to the velocity and the acceleration of the drive axis based on the acceleration/deceleration parameter which is set or updated by the parameter setting part, and contrastively displays the actual acceleration/deceleration characteristic curve and the commanded acceleration/deceleration characteristic curve; and a setting information outputting part which outputs the acceleration/deceleration parameter which is set or updated by the parameter setting part, to the numerical controller.

In a preferred embodiment, the parameter setting part sets or updates at least two designated coordinates on a graph relating to the velocity and the acceleration of the drive axis as the acceleration/deceleration parameter; and the acceleration/deceleration characteristic displaying part plots the at least two designated coordinates on the graph and displays the commanded acceleration/deceleration characteristic curve as a line through the at least two plotted coordinates. In this case, the parameter setting part may set or update an acceleration relating to a predetermined velocity as the acceleration/deceleration parameter; and the acceleration/deceleration characteristic displaying part may plot at least two setup or updated coordinates of acceleration relating to the predetermined velocity on a graph relating to the velocity and the acceleration of the drive axis, and displays the commanded acceleration/deceleration characteristic curve as a line through the at least two plotted coordinates.

Further, the acceleration/deceleration characteristic displaying part may be configured to display a second actual acceleration/deceleration characteristic curve in which a predetermined margin is added to the actual acceleration/deceleration characteristic curve.

In a preferred embodiment, the parameter setting part sets or updates a mathematical formula representing the commanded acceleration/deceleration characteristic curve as the acceleration/deceleration parameter; and the acceleration/deceleration characteristic displaying part generates and displays the commanded acceleration/deceleration characteristic curve based on the mathematical formula.

In a preferred embodiment, the parameter setting part automatically updates the acceleration/deceleration parameter based on a position of a plotted point of the commanded acceleration/deceleration characteristic curve or a position of a line segment through the plotted points, the position of the plotted point or the position of the line segment being changed by using an external inputting device which is selected from a group including a touch panel, a mouse and a keyboard.

In a preferred embodiment, the parameter setting part is configured to set different acceleration/deceleration parameters in relation to the drive axis when being accelerated and when being decelerated, respectively, or in relation to the drive axis moving in different directions, respectively; and the acceleration/deceleration characteristic displaying part contrastively displays the actual acceleration/deceleration characteristic curve and the commanded acceleration/deceleration characteristic curve, in relation to the drive axis when being accelerated and when being decelerated, respectively, or in relation to the drive axis moving in the different directions, respectively.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
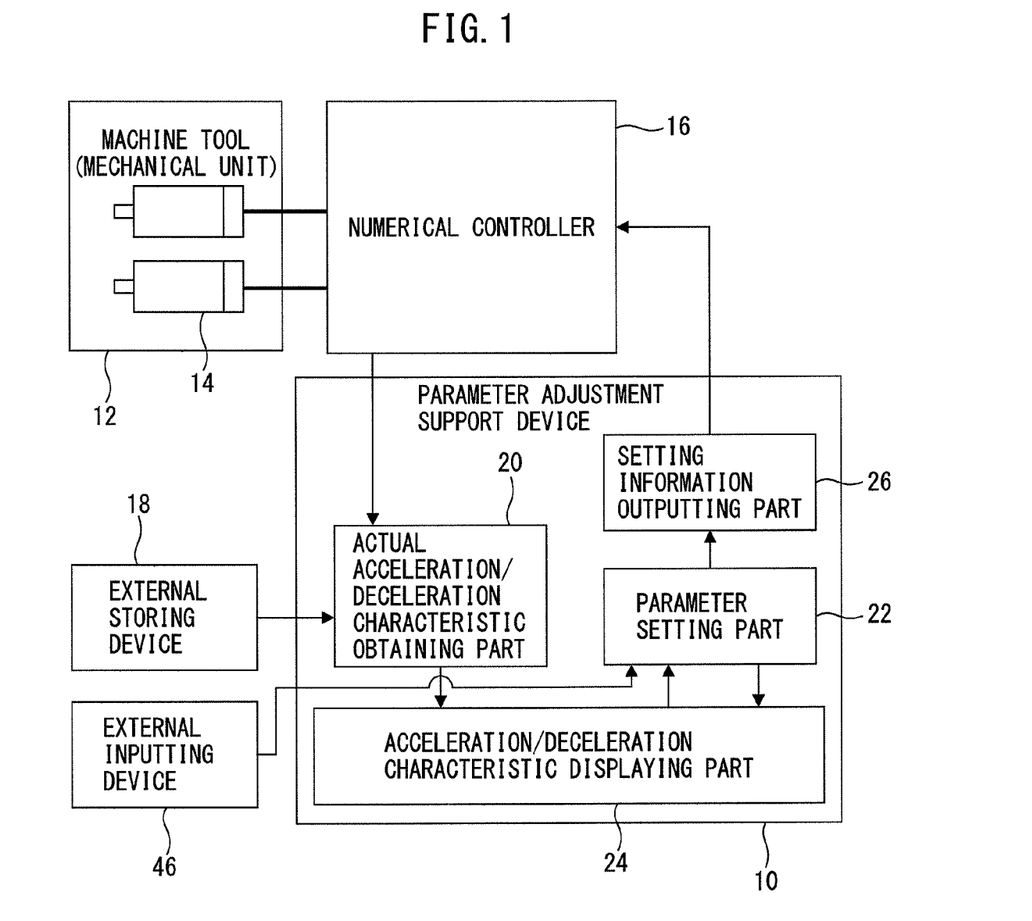
FIG. 1 is a functional block diagram showing a parameter adjustment support device according to the present invention, along with a machine tool and a numerical controller.

FIG. 1 is a functional block diagram showing a parameter adjustment support device (hereinafter, also referred to as merely a support device) according to a preferred embodiment of the present invention. Support device 10 is used with a numerical controller (NC) 16 which controls at least one drive axis 14 of a machine 12 such as a machine tool or a multi-joint robot (mechanical unit). Numerical controller 16 controls acceleration/deceleration process relating to a movement command given by an NC program, etc., and generates a movement command (or a position command) for drive axis 14 according to a commanded acceleration/deceleration characteristic curve previously given by an acceleration/deceleration parameter.

Support device 10 is used with numerical controller 16 and is configured to support adjustment of the acceleration/deceleration parameter by an operator. Support device 10 includes: an actual acceleration/deceleration characteristic obtaining part 20 which obtains an actual acceleration/deceleration characteristic curve relating to a velocity and an acceleration of drive axis 14, from numerical controller 16 or an external storing device 18; a parameter setting part 22 which sets or changes the acceleration/deceleration parameter based on an external input (normally by the operator); an acceleration/deceleration characteristic displaying part 24 which generates the commanded acceleration/deceleration characteristic curve relating to the velocity and the acceleration of drive axis 14 based on the acceleration/deceleration parameter which is set or updated by parameter setting part 22, and contrastively displays the obtained actual acceleration/deceleration characteristic curve and the generated commanded acceleration/deceleration characteristic curve; and a setting information outputting part 26 which outputs the acceleration/deceleration parameter which is set or updated by parameter setting part 22, to numerical controller 16.

In the above embodiment, support device 10 is illustrated and explained as a device separated from numerical controller 16. However, a device having a function substantially equivalent to support device 10 may be incorporated into numerical controller 16, and such a device is also included in the scope of the present invention.

Herein, the "actual acceleration/deceleration characteristic curve" means a curve representing the limit of acceleration characteristic which the drive axis (or a motor such as a servomotor for driving the drive axis) can actually perform. In general, the upper limit of the acceleration is determined by the maximum output torque and the load inertia of the motor. Normally, since a parameter relating to the output torque (output characteristic) of the motor is a fixed value, the actual acceleration/deceleration characteristic curve may also be constant. In addition, the acceleration/deceleration characteristic curve may be generated based on measured values obtained by actually driving the drive axis. Otherwise, the actual acceleration/deceleration characteristic curve may be generated (calculated) as an ideal characteristic curve based on the motor output characteristic, etc., without using the actual measured value.

Herein, the "commanded acceleration/deceleration characteristic curve" means a curve representing acceleration characteristic which is commanded for the motor. The commanded acceleration corresponding to the velocity is determined by the acceleration/deceleration parameter. Therefore, the commanded acceleration (or the commanded acceleration/deceleration characteristic curve) may be determined based on the acceleration/deceleration parameter in the present invention.

Figure 2:
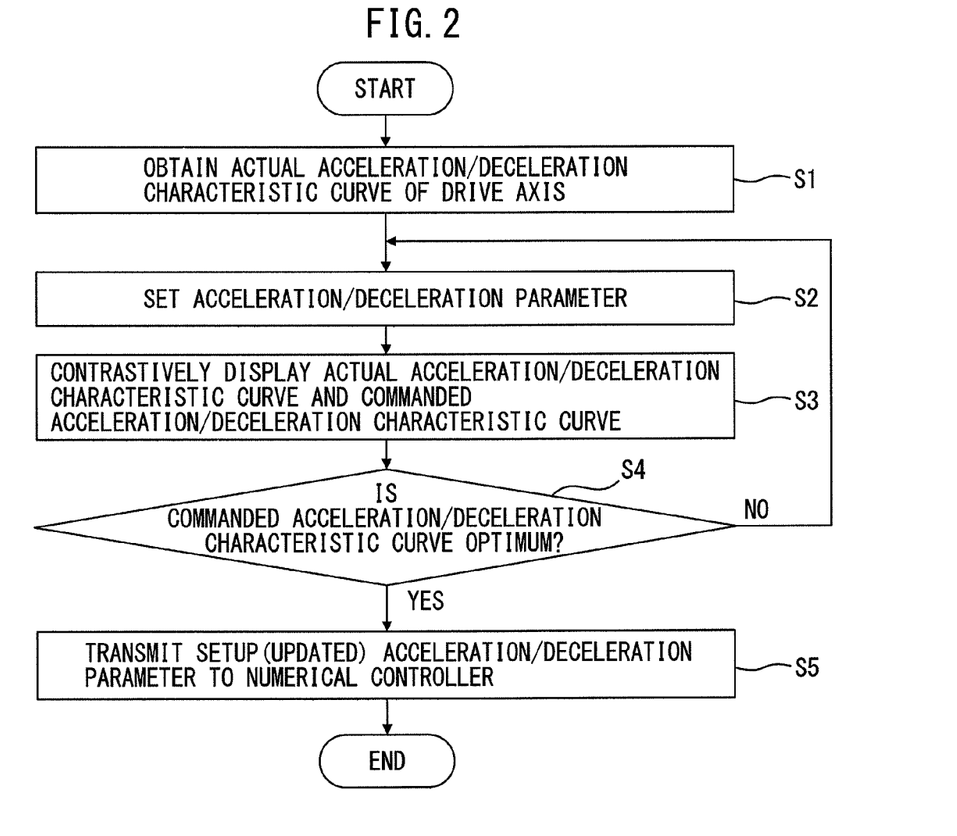
FIG. 2 is a flowchart showing an example of the procedure using the parameter adjustment support device of FIG. 1.

Hereafter, the function of support device 10 is explained with reference to a flowchart of FIG. 2.

First, in step S1, actual acceleration/deceleration characteristic obtaining part 20 obtains an actual acceleration/deceleration characteristic curve of drive axis 14 represented by the velocity and the acceleration, which is previously stored in numerical controller or external storing device 18. The acceleration/deceleration characteristic curve represents acceleration performance of drive axis 14, i.e., the maximum acceleration at each velocity when drive axis 14 is actually driven. In this regard, since actual torque output characteristic is obtained by multiplying the acceleration performance by inertia, the actual torque output characteristic curve may be used instead of the actual acceleration/deceleration characteristic curve.

Next, in step S2, parameter setting part 22 sets or changes (updates) the acceleration/deceleration parameter of the drive axis based on information obtained by external input (normally, input operation by the operator using a numeric keypad, etc.). Table 1 and FIG. 3 indicate a first example for setting the acceleration/deceleration parameter, wherein at least two coordinates (in this example, five coordinates P0 to P4), designated on a graph relating to the velocity and the acceleration of drive axis 14, are set as the acceleration/deceleration parameter.

TABLE 1

Figure 3:
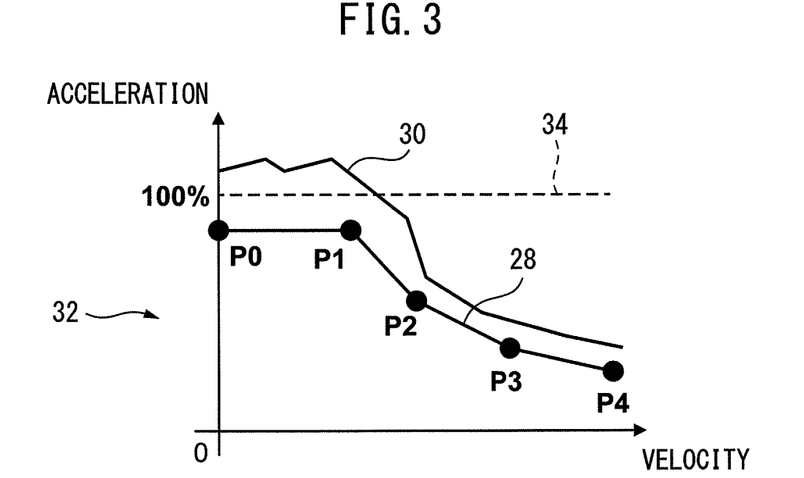
FIG. 3 is a graph showing a first example of setting an acceleration/deceleration parameter.

|    | Velocity | Acceleration |
|----|----------|--------------|
| P0 | 0 rpm    | 90%          |
| P1 | 1500 rpm | 90%          |
| P2 | 2000 rpm | 72%          |
| P3 | 3000 rpm | 43%          |
| P4 | 6000 rpm | 23%          |

Next, in step S3, as exemplified in FIG. 3, acceleration/deceleration characteristic displaying part 24 generates a commanded acceleration/deceleration characteristic curve 28 based on the acceleration/deceleration parameter setup or updated by acceleration/deceleration parameter setting part 22, and displays commanded acceleration/deceleration characteristic curve 28 and actual acceleration/deceleration characteristic curve 30 obtained by actual acceleration/deceleration characteristic obtaining part 20, on a graph 32 representing the relationship between the velocity and the acceleration of the drive axis, by using a proper display, so that the operator can easily compare the two curves to each other. In this regard, when the actual torque output characteristic curve is used instead of the actual acceleration/deceleration characteristic curve in step S1, it is preferable that, also in step S3, a commanded torque output characteristic curve, obtained by multiplying the commanded acceleration/deceleration characteristic by inertia, be used instead of the commanded acceleration/deceleration characteristic curve. When the actual and commanded torque output characteristic curves are used instead of the actual and commanded acceleration/deceleration characteristic curves, the substantially same effect is obtained in the present invention. Therefore, such a case is also included in the scope of the present invention.

Next, in step S4, it is judged whether commanded acceleration/deceleration characteristic curve 28 displayed by acceleration/deceleration characteristic displaying part 24 is optimum or not. Concretely, the operator judges whether commanded acceleration/deceleration characteristic curve 28 has a portion which is higher than or excessively lower than actual acceleration/deceleration characteristic curve 30 or not, etc. When it is judged that commanded acceleration/deceleration characteristic curve 28 is not optimized (for example, commanded acceleration/deceleration characteristic curve 28 partially exceeds actual acceleration/deceleration characteristic curve 30, or a portion of commanded acceleration/deceleration characteristic curve 28 is excessively lower than actual acceleration/deceleration characteristic curve 30), the procedure is returned to step S2 so that the acceleration/deceleration parameter is changed or updated. In this case, acceleration/deceleration characteristic displaying part 24 regenerates and redisplays the commanded acceleration/deceleration characteristic curve based on the updated acceleration/deceleration parameter.

On the other hand, when it is judged that commanded acceleration/deceleration characteristic curve 28 is optimized, setting information outputting part 26 transmits the latest acceleration/deceleration parameter to numerical controller 16 (step S5). This transmission can be carried out automatically. Numerical controller 16 generates the commanded acceleration/deceleration characteristic curve based on the latest acceleration/deceleration parameter from setting information outputting part 26, and generates a proper movement command for drive axis 14. In addition, the acceleration/deceleration parameter output from setting information outputting part 26 may be converted into a value, etc., adapted for the process of numerical controller 16 before being transmitting to numerical controller 16, and such a case is also included in the scope of the present invention.

In the example of Table 1 and FIG. 3, the coordinates of plotted points P0 to P4 on graph 32, wherein the horizontal and vertical axes represent the velocity and the acceleration, respectively, are designated as the acceleration/deceleration parameter, and commanded acceleration/deceleration characteristic curve 28 is displayed. The operator can set the acceleration/deceleration parameter so that commanded acceleration/deceleration characteristic curve 28 has a desired shape, while comparing commanded acceleration/deceleration characteristic curve 28 to actual acceleration/deceleration characteristic curve 30 on the display. As described above, when the coordinates of at least two plotted points are designated, information relating to the coordinates are set as the acceleration/deceleration parameter. In graph 32 of FIG. 3, units of the velocity (the horizontal axis) and the acceleration (the vertical axis) are represented by "rpm" and "%," respectively, and "100%" relating to the acceleration (indicated by a dashed line 34) means the maximum acceleration which is previously set based on other constraint conditions such as the maximum permissible current value and/or a rated torque of the motor, etc. However, the other units may be used as the horizontal and vertical axes. For example, a general acceleration unit such as "m/s$^2$" may be used as the unit of the acceleration.

The coordinates designated by the operator are stored as the acceleration/deceleration parameter, and acceleration/deceleration displaying part 24 generates and displays commanded acceleration/deceleration characteristic curve 28 by connecting the designated coordinates by using a line or curve. Simultaneously, as shown in FIG. 3, actual acceleration/deceleration characteristic curve 30, obtained by actual acceleration/deceleration characteristic obtaining part 20, is displayed so as to be compared to commanded acceleration/deceleration characteristic curve 28 (normally, on the same graph). Therefore, the operator can determine the optimum acceleration/deceleration parameter or optimize the acceleration/deceleration parameter, while comparing commanded acceleration/deceleration characteristic curve 28 and actual acceleration/deceleration characteristic curve 30. Further, the operator can arbitrarily set the coordinates on the graph, and also can set or change only the acceleration relating to the predetermined (fixed) velocity.

Figure 4:
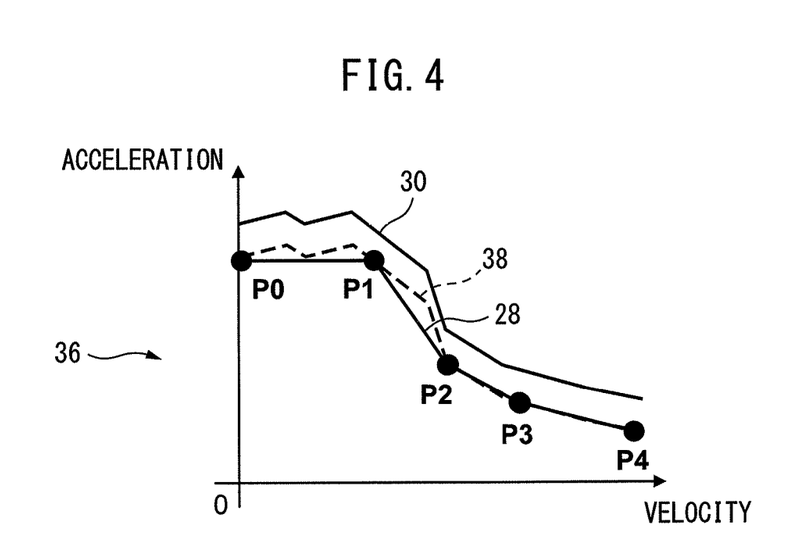
FIG. 4 is a graph showing a second example of setting an acceleration/deceleration parameter.

In many cases, drive axis 14 is subject to load or friction force during machining such as cutting. Therefore, when the torque (or acceleration) corresponding to the load or the friction force is previously known, the operator can easily determine the optimum acceleration/deceleration parameter by using a second actual acceleration/deceleration characteristic curve in which the above torque or acceleration is considered as a margin, without repeatedly adjusting the parameter. Concretely, FIG. 4 shows a second example for setting the acceleration/deceleration parameter while taking the above margin into consideration. As indicated by a graph 36 in FIG. 4, a margin relating to the cutting load and friction force of drive axis 14 is set as a ratio (20% in this example) relative to the maximum acceleration (100%), and a second acceleration/deceleration characteristic curve 38 is generated and displayed relating to actual acceleration/deceleration characteristic curve 30 as described above. Therefore, the operator can determine the acceleration/deceleration parameter so that commanded acceleration/deceleration characteristic curve 28 is adapted to second actual acceleration/deceleration characteristic curve 38. In this case, the operator sets or updates the acceleration relating to the given velocity, while taking the margin into consideration.

In this regard, when actual acceleration/deceleration characteristic curve 30 is obtained based on a result wherein drive axis 14 is actually driven, acceleration/deceleration characteristic curve 30 includes a component relating to the friction force, and thus it is not necessary to take the friction force into consideration in setting the margin. On the other hand, when actual acceleration/deceleration characteristic curve 30 is an ideal acceleration/deceleration characteristic curve which is generated (calculated) based on the motor output characteristic, etc., it is preferable that the friction force be taken into consideration as the margin.

Figure 5:
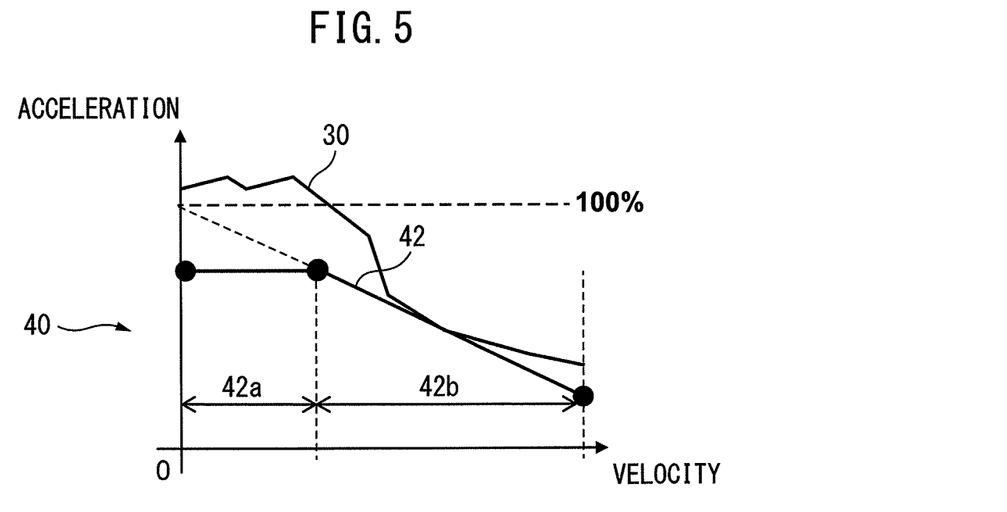
FIG. 5 is a graph showing a third example of setting an acceleration/deceleration parameter.

Table 2 and FIG. 5 indicate a third example for setting the acceleration/deceleration parameter. In the third example, instead of designating the coordinates of plotted points on a graph 40 wherein the horizontal and vertical axes represent the velocity and the acceleration, respectively, a mathematical formula, representing a commanded acceleration/deceleration characteristic curve to be generated, is designated as the acceleration/deceleration parameter, as shown in Table 2. In the example of Table 2, a commanded acceleration/deceleration characteristic curve 42 is divided into two segments 42a and 42b based on velocity value (V), and a slope and an intercept are determined in each segment, whereby commanded acceleration/deceleration characteristic curve 42 as shown in FIG. 5 may be generated and displayed.

TABLE 2

| Section | Intercept | Slope |
|---|---|---|
| 0 rpm ≤ V ≤ 1500 rpm | 80% | 0%/rpm |
| 1500 rpm < V ≤ 6000 rpm | 100% | −0.013%/rpm |

Figure 6:
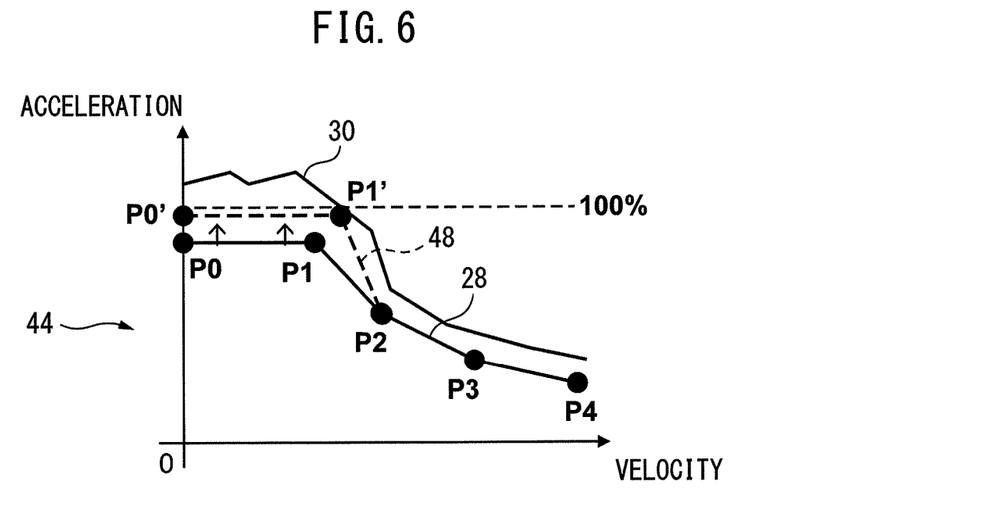
FIG. 6 is a graph showing a fourth example of setting an acceleration/deceleration parameter.

Table 3 and FIG. 6 indicate a fourth example for setting the acceleration/deceleration parameter. In the first setting example as indicated by Table 1 and FIG. 3, the commanded acceleration/deceleration characteristic curve is generated and displayed based on the information (value) which is set by parameter setting part 20. However, in the fourth setting example, on a graph 44 wherein the horizontal and vertical axes represent the velocity and the acceleration, plotted points and/or a line or curve through the plotted points are moved by means of external inputting device 46 (schematically shown in FIG. 1) such as a touch panel, a mouse or a keyboard, etc., whereby the acceleration/deceleration parameter may be changed.

TABLE 3

| | Velocity | Acceleration | | | Velocity | Acceleration |
|---|---|---|---|---|---|---|
| P0 | 0 rpm | 90% | => | P0' | 0 rpm | 97% |
| P1 | 1500 rpm | 90% | | P1' | 1700 rpm | 97% |
| P2 | 2000 rpm | 72% | | P2' | 2000 rpm | 72% |
| P3 | 3000 rpm | 43% | | P3' | 3000 rpm | 43% |
| P4 | 6000 rpm | 23% | | P4' | 6000 rpm | 23% |

For example, as shown in FIG. 6, when two points P0 and P1 on commanded acceleration/deceleration characteristic curve 28 are moved to P0' and P1', respectively, by means of external inputting device 46 as described above, information of the acceleration/deceleration parameter is automatically updated as shown in Table 3. Accordingly, as shown in FIG. 6, updated commanded acceleration/deceleration characteristic curve 48 is displayed. As such, even when the operator does not input concrete values, the optimum parameter adjustment may be visually carried out.

When machine 12, to which support device 10 of the invention is applied, is a machine tool for carrying out a tapping process wherein a tapped hole is formed by accelerating/decelerating a spindle, the cutting load applied to the spindle (or the drive shaft) is different between when tapping or drilling and when withdrawing after the tapping. Further, the acceleration/deceleration characteristic may be different between when accelerating and when decelerating. As such, the different acceleration/deceleration parameters should be set relating to when accelerating the drive shaft and when decelerating the drive shaft, respectively, or relating to when the drive shaft is moved in the different directions, respectively, the acceleration/deceleration parameter may be set relating to each condition and a graph may be displayed relating to each condition, as in a fifth setting example indicated by Table 4, FIG. 7a and FIG. 7b.

TABLE 4

Figure 7A:
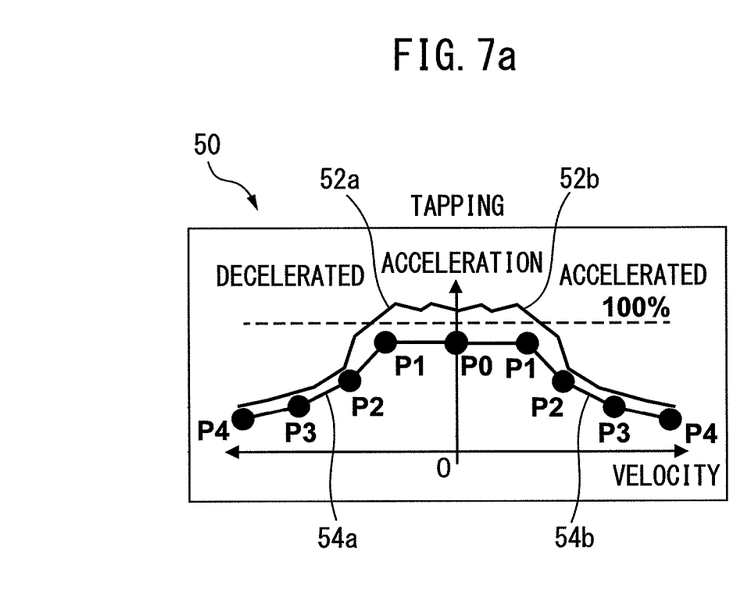
FIG. 7a is a graph showing a fifth example of setting an acceleration/deceleration parameter, wherein a drive axis carries out punching operation.
Figure 7B:
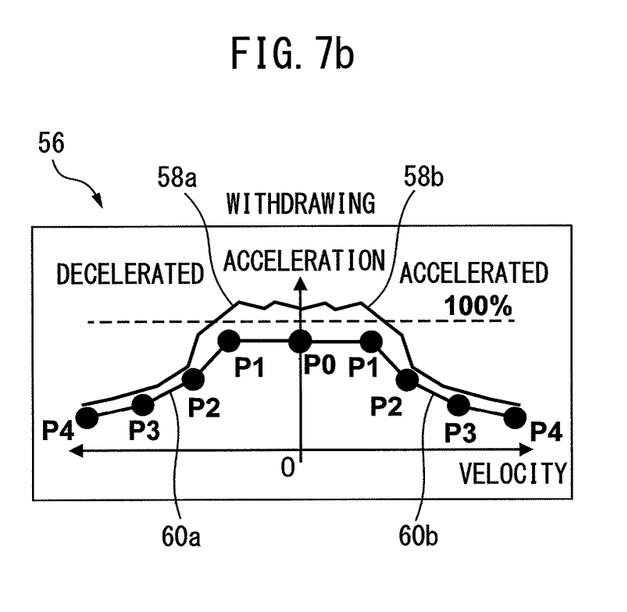
FIG. 7b is a graph showing the fifth example of setting an acceleration/deceleration parameter, wherein the drive axis carries out withdrawing operation.

| | | +Direction | | −Direction | |
|---|---|---|---|---|---|
| | Velocity | Deceleration | Acceleration | Deceleration | Acceleration |
| P0 | 0 rpm | 89% | 90% | 87% | 88% |
| P1 | 1500 rpm | 89% | 90% | 87% | 88% |
| P2 | 2000 rpm | 71% | 72% | 69% | 70% |
| P3 | 3000 rpm | 42% | 43% | 40% | 41% |
| P4 | 6000 rpm | 22% | 23% | 20% | 21% |

Concretely, as shown in Table 4, with respect to each of five plotted points Po to P4 corresponding to the predetermined velocity values, the acceleration of the drive axis can be set relating to four conditions, i.e., when the movement direction of the drive axis is different (when tapping (+direction) and withdrawing (−direction)), and further, when the drive axis is decelerated or accelerated in each movement direction.

In this case, as indicated by a graph 50 as shown in FIG. 7a, actual acceleration/deceleration characteristic curves 52a and 52b are displayed relating to the decelerated state and accelerated state when tapping (or when the drive axis is moved in the +direction), respectively. Simultaneously, commanded acceleration/deceleration characteristic curves 54a and 54b corresponding to actual acceleration/deceleration characteristic curves 52a and 52b are contrastively displayed. Similarly, as indicated by a graph 56 as shown in FIG. 7b, actual acceleration/deceleration characteristic curves 58a and 58b are displayed relating to the decelerated state and accelerated state when withdrawing (or when the drive axis is moved in the −direction), respectively, and simultaneously, commanded acceleration/deceleration characteristic curves 60a and 60b corresponding to actual acceleration/deceleration characteristic curves 58a and 58b are contrastively displayed. In addition, the different acceleration values are set relating to the velocity values in each condition in Table 4, whereas the velocity value may be changed in each condition.

Similarly to FIG. 3, in FIGS. 4 to 7b, units of the velocity (the horizontal axis) and the acceleration (the vertical axis) are represented by "rpm" and "%," respectively (wherein "100%" means the maximum acceleration which is previously set based on a given constraint condition). However, the other units may be used as the horizontal and vertical axes. For example, a general acceleration unit such as "m/s$^2$" may be used as the unit of the acceleration.

According to the present invention, the actual acceleration/deceleration characteristic curve and the commanded acceleration/deceleration characteristic curve of the drive axis are contrastively displayed. Therefore, even when the operator lacks sufficient knowledge and skill, the operator can easily adjust the acceleration/deceleration parameter for determining the commanded acceleration/deceleration characteristic curve, with less effort and time. Further, the acceleration/deceleration parameter adjusted by the operator can be automatically transmitted to the numerical controller, whereby the acceleration/deceleration of the drive axis can be effectively controlled based on the adjusted parameter.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A parameter adjustment support device for supporting adjustment of an acceleration/deceleration parameter, used with a numerical controller which generates a movement command for a drive axis by using a commanded acceleration/deceleration characteristic curve previously given by the acceleration/deceleration parameter, the parameter adjustment support device comprising:
   an actual acceleration/deceleration characteristic obtaining part which obtains an actual acceleration/deceleration characteristic curve relating to a velocity and an acceleration of the drive axis, from the numerical controller or an external storing device;
   a parameter setting part which sets or changes the acceleration/deceleration parameter based on an external input;
   an acceleration/deceleration characteristic displaying part which generates the commanded acceleration/deceleration characteristic curve relating to the velocity and the acceleration of the drive axis based on the acceleration/deceleration parameter which is set or updated by the parameter setting part, and contrastively displays the actual acceleration/deceleration characteristic curve and the commanded acceleration/deceleration characteristic curve; and
   a setting information outputting part which outputs the acceleration/deceleration parameter which is set or updated by the parameter setting part, to the numerical controller.

2. The parameter adjustment support device as set forth in claim 1, wherein the parameter setting part sets or updates at least two designated coordinates on a graph relating to the velocity and the acceleration of the drive axis as the acceleration/deceleration parameter; and
   wherein the acceleration/deceleration characteristic displaying part plots the at least two designated coordinates on the graph and displays the commanded acceleration/deceleration characteristic curve as a line through the at least two plotted coordinates.

3. The parameter adjustment support device as set forth in claim 2, wherein the parameter setting part sets or updates an acceleration relating to a predetermined velocity as the acceleration/deceleration parameter; and
   wherein the acceleration/deceleration characteristic displaying part plots at least two setup or updated coordinates of acceleration relating to the predetermined velocity on a graph relating to the velocity and the acceleration of the drive axis, and displays the commanded acceleration/deceleration characteristic curve as a line through the at least two plotted coordinates.

4. The parameter adjustment support device as set forth in claim 2, wherein the acceleration/deceleration characteristic displaying part is configured to display a second actual acceleration/deceleration characteristic curve in which a predetermined margin is added to the actual acceleration/deceleration characteristic curve.

5. The parameter adjustment support device as set forth in claim 1, wherein the parameter setting part sets or updates a mathematical formula representing the commanded acceleration/deceleration characteristic curve as the acceleration/deceleration parameter; and
   wherein the acceleration/deceleration characteristic displaying part generates and displays the commanded acceleration/deceleration characteristic curve based on the mathematical formula.

6. The parameter adjustment support device as set forth in claim 1, wherein the parameter setting part automatically updates the acceleration/deceleration parameter based on a position of a plotted point of the commanded acceleration/deceleration characteristic curve or a position of a line segment through the plotted points, the position of the plotted point or the position of the line segment being changed by using an external inputting device which is selected from a group including a touch panel, a mouse and a keyboard.

7. The parameter adjustment support device as set forth in claim 1, wherein the parameter setting part is configured to set different acceleration/deceleration parameters in relation to the drive axis when being accelerated and when being decelerated, respectively, or in relation to the drive axis moving in different directions, respectively; and
   wherein the acceleration/deceleration characteristic displaying part contrastively displays the actual acceleration/deceleration characteristic curve and the commanded acceleration/deceleration characteristic curve, in relation to the drive axis when being accelerated and when being decelerated, respectively, or in relation to the drive axis moving in the different directions, respectively.

* * * * *